(12) United States Patent
Prakash et al.

(10) Patent No.: US 11,775,896 B2
(45) Date of Patent: Oct. 3, 2023

(54) COMPUTERIZED SYSTEMS AND METHODS FOR AUTOMATICALLY GENERATING AND DISPLAYING A UNIFIED ASSET CENTRIC ANALYTICS ELECTRONIC INTERFACE

(71) Applicant: AVEVA SOFTWARE, LLC, Lake Forest, CA (US)

(72) Inventors: Ravi Kumar Herunde Prakash, Lake Forest, CA (US); Sudhir Gonugunta, Rancho Santa Margarita, CA (US)

(73) Assignee: AVEVA SOFTWARE, LLC, Lake Forest, CA (US)

( * ) Notice: Subject to any disclaimer, the term of this patent is extended or adjusted under 35 U.S.C. 154(b) by 0 days.

(21) Appl. No.: 17/095,133

(22) Filed: Nov. 11, 2020

(65) Prior Publication Data

US 2021/0142245 A1  May 13, 2021

Related U.S. Application Data

(60) Provisional application No. 62/933,746, filed on Nov. 11, 2019.

(51) Int. Cl.
*G06F 3/0481* (2022.01)
*G06Q 10/0631* (2023.01)
*H04L 67/52* (2022.01)

(52) U.S. Cl.
CPC ..... *G06Q 10/06313* (2013.01); *G06F 3/0481* (2013.01); *H04L 67/52* (2022.05); *G06F 2203/04803* (2013.01)

(58) Field of Classification Search
CPC .... G06F 2203/04803; G06Q 10/06313; H04L 67/52
See application file for complete search history.

(56) References Cited

U.S. PATENT DOCUMENTS

2006/0190391 A1\* 8/2006 Cullen, III ............ G06Q 10/10
705/37
2013/0110675 A1\* 5/2013 Bouw .................... G06Q 30/04
705/26.8

(Continued)

FOREIGN PATENT DOCUMENTS

KR 10-1590007 B1 1/2016

OTHER PUBLICATIONS

Korean Intellectual Property Office, International Search Report and Written Opinion for International Application No. PCT/US2020/059963, dated Feb. 26, 2021, 9 pages, Korea.

*Primary Examiner* — Andrea C Leggett
(74) *Attorney, Agent, or Firm* — Greenberg Traurig, LLP

(57) ABSTRACT

Disclosed are systems and methods for improving interactions with and between computers in content providing, searching and/or hosting systems supported by or configured with devices, servers and/or platforms. The disclosed systems and methods provide a novel asset management and visualization framework that automatically generates and causes display of a unified asset centric analytics electronic interface. The framework composes selected data based on asset metrics and renders a display that conveys a unified, asset-centric analytics user interface. The framework is configured to track or monitor detailed metrics for a collection of assets, and filter, select, and present determined critical data within the UI, in some embodiments, as interactive, electronic cards and/or as an asset tree of information that is configured to be navigated upon display.

20 Claims, 11 Drawing Sheets

(56) References Cited

U.S. PATENT DOCUMENTS

| | | |
|---|---|---|
| 2014/0244325 A1 | 8/2014 | Cartwright |
| 2015/0009013 A1 | 1/2015 | Cartwright et al. |
| 2017/0093838 A1* | 3/2017 | Eckl .................. H04L 63/08 |
| 2018/0349446 A1 | 12/2018 | Triolo et al. |
| 2018/0357292 A1* | 12/2018 | Rai .................. G06F 16/2455 |
| 2019/0304019 A1 | 10/2019 | Vaidyanathan et al. |
| 2020/0011683 A1* | 1/2020 | Simpson ............... G06F 16/29 |
| 2020/0135005 A1* | 4/2020 | Katz .................. H04M 7/0021 |
| 2020/0292608 A1* | 9/2020 | Yan .................. G06N 3/0445 |
| 2021/0004397 A1* | 1/2021 | Beaumier ......... H04N 21/8113 |

* cited by examiner

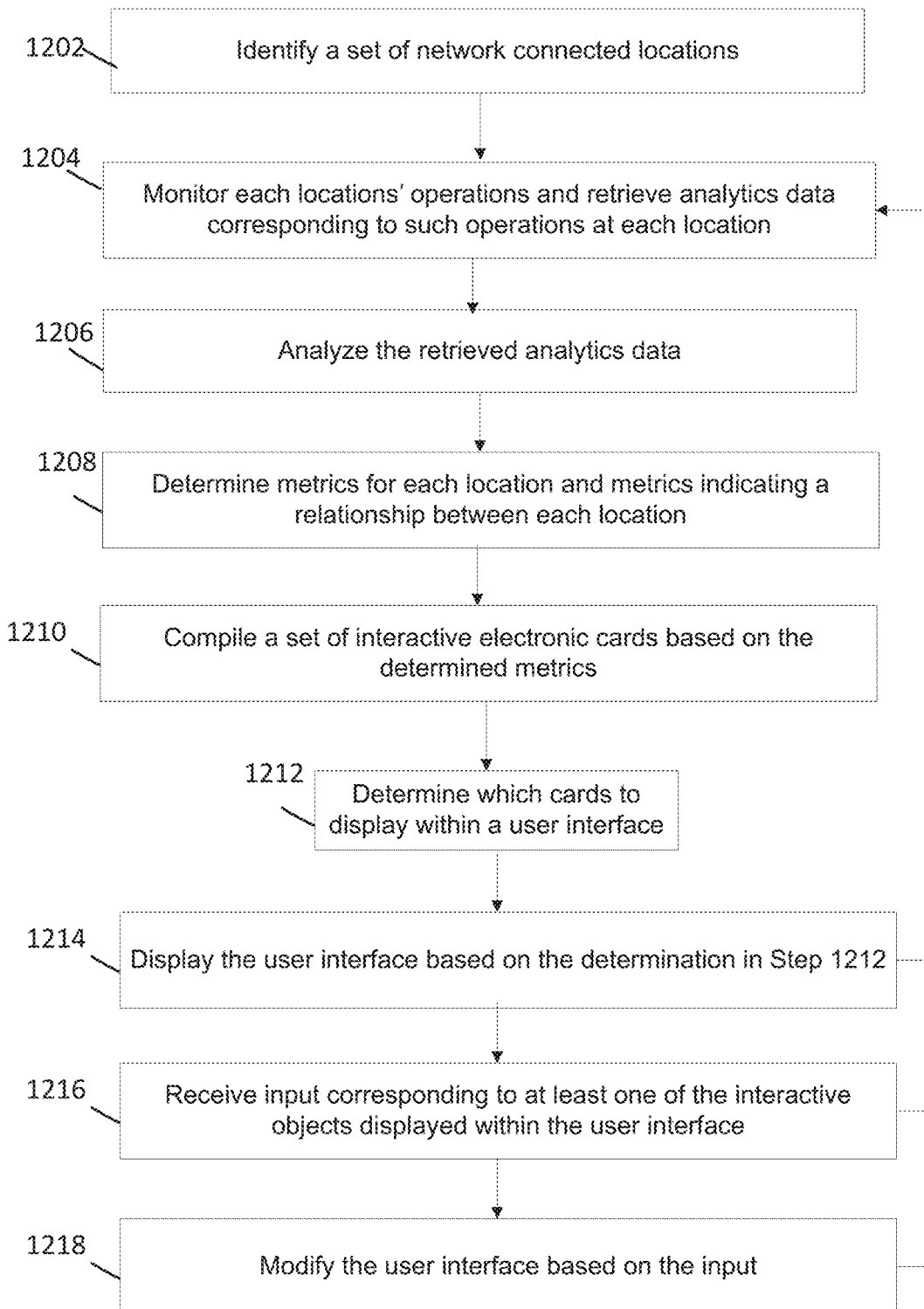

COMPUTERIZED SYSTEMS AND METHODS FOR AUTOMATICALLY GENERATING AND DISPLAYING A UNIFIED ASSET CENTRIC ANALYTICS ELECTRONIC INTERFACE

CROSS-REFERENCE TO RELATED APPLICATIONS

This application claims the benefit of priority from U.S. Provisional Application No. 62/933,746, filed Nov. 11, 2019, entitled "Automatic Composition of Various Asset Based Metrics To Provide A Unified, Asset Centric Analytics Page System and Server," which is incorporated herein by reference in its entirety.

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

Some embodiments relate generally to improving the performance of network-based computerized content hosting and providing devices, systems and/or platforms by modifying the capabilities and providing non-native functionality to such devices, systems and/or platforms through a novel and improved asset management and visualization framework for automatically generating and causing display of a unified, interactive, asset centric analytics electronic interface.

BACKGROUND

Conventional industrial and information analytics infrastructures typically host silos of information that are based in a wide variety of systems that such infrastructures host and/or are in contact with (e.g., network connections and/or local connections on-site, for example). Such system can include, but are not limited to, alarm systems, quality systems and process systems, and the like. Current data compilation and visualization techniques, either inherent to the system's infrastructures or provided by third party entities, are often disjointed and based on an individual system's tags, various equipment tags, and the like. This leads to a muddled display of data, which can be in separate formats, which leads to an unintegrated manner in which data is compiled and displayed, which, is not guaranteed due to the disparate mechanisms such data is put together (e.g., based on proprietary tags).

SUMMARY

According to some embodiments, the instant disclosure provides systems and methods for asset management and visualization that, among other features and benefits, addresses the shortcomings in the art in a centralized manner. Some embodiments of the instant disclosure, among other features as evident from the disclosure herein, facilitate and enable systems from disparate locations with different functionalities and configurations to interact and have their data seamlessly produced in a universal manner, thereby providing a user or system administrator, or program (e.g., software executing in the cloud and/or within the network confines of the infrastructure(s)) with the computerized capabilities of understanding how an operation is running and in order to quickly address critical issues or components that require immediate attention.

Some embodiments of the instant disclosure involve composing selected data based on asset metrics and rendering a display that conveys a unified, asset-centric analytics user interface. As discussed herein, some embodiments involve particular types of analytics, from particular sources, to be displayed as interactive electronic cards (or tiles).

According to some embodiments, in a non-limiting example, some industrial sites employ hundreds or thousands of assets to carry out industrial operations. In some embodiments, the assets can be physical assets that operate at a location, for example plant (for example, a drill or tool operating at a job site). In some embodiments, an asset can be or can include a digital or electronic component (for example, a program or application executing the drill).

Ensuring the correct operation of assets is critical to managing an industrial site. Assets may experience several issues such as, but not limited to, unscheduled downtime, failure, defects, maintenance, unproductivity, and other issues that affect the efficiency and workflow of the industrial site. In response to monitoring and tracking detailed metrics for a collection of assets, some embodiments provide an innovative user interface that filters, selects, and presents critical data as interactive interface objects (e.g., or electronic cards or tiles) within an assets page displayed within the interface.

As described below, some embodiments of the user interface may present a unified asset tree that can be navigated. In some embodiments, the user interface may comprise asset-specific metrics that are combined together using tiles within an asset context.

Some embodiments provide computerized methods for implementing a novel and improved asset management and visualization framework for automatically generating and causing display of a unified, interactive, asset centric analytics electronic interface.

Some embodiments provide a non-transitory computer-readable storage medium for carrying out the above mentioned technical steps of the framework's functionality. The non-transitory computer-readable storage medium has tangibly stored thereon, or tangibly encoded thereon, computer readable instructions that when executed by a device (e.g., application server, messaging server, email server, ad server, content server and/or client device, and the like) cause at least one processor to perform a method for a novel and improved asset management and visualization framework for automatically generating and causing display of a unified, interactive, asset centric analytics electronic interface.

In accordance with some embodiments, a system is provided that comprises one or more computing devices configured to provide functionality in accordance with such embodiments. In accordance with some embodiments, functionality is embodied in steps of a method performed by at least one computing device. In accordance with some embodiments, program code (or program logic) executed by a processor(s) of a computing device to implement functionality is embodied in, by and/or on a non-transitory computer-readable medium.

According to some embodiments, a computing device is disclosed which comprises: one or more processors; and a memory having stored therein a sequence of instructions, that when executed by the one or more processors, cause the one or more processors to perform actions comprising: receiving, over a network, asset information corresponding to a set of physical assets at a location, the asset information comprising electronic data indicating information associated with each asset's operation at the location; storing the asset information within a data store associated with the computing device; compiling, via execution of an application program interface (API), a set of tiles based on the stored asset information, each tile in the set of tiles corresponding to an asset within the set of physical assets, each tile being an interactive interface object that displays a respective asset's electronic data; generating, via the API, a user interface (UI), the UI comprising an electronic page with interactive functionality for displaying the set of tiles; and automatically causing display of the UI.

In some embodiments, the computing device performs further actions comprising: analyzing the data related to an asset's operation at the location; and determining, based on the analysis, a type of tile, wherein the compiled tile for the asset is based on the determined type.

In some embodiments, the computing device performs further actions comprising: analyzing the data related to an asset's operation at the location; determining, based on the analysis, whether a critical issue with the asset or the location is present; and identifying a subset of tiles based on the critical issue determination, wherein the UI is modified to display only the subset of tiles.

In some embodiments, the computing device performs further actions comprising: receiving, via the UI, input related to a first tile within the displayed set of tiles of the UI; modifying, based on the input, attributes of the first tile based on the input; and modifying, based on the input, attributes of other tiles in the displayed set of tiles based on modification of the first tile. In some embodiments, the attributes of the first tile and the other tiles corresponds to display characteristics of the tile. In some embodiments, the input corresponds to a refresh request, wherein the attributes of the first tile corresponds to information displayed within the first tile related to operation of a respective asset at the location.

In some embodiments, the asset page further comprises an interface object associated with hierarchical mapping of each of the set of physical assets at the location, the interface object comprising a displayable node interface that enables additional elements associated with related assets within to hierarchical mapping to be displayed upon interaction with the node interface.

In some embodiments, the set of tiles comprises data associated with a type of electronic card selected from a group consisting of: a pareto card, a Manufacturing Execution System (MES) card, an insight chart card, an alarms card, a generic card and an alerts card. In some embodiments, the pareto card comprises information indicating metrics for critical data for the set of physical assets operations at the location. In some embodiments, the MES card comprises MES data for a particular asset. In some embodiments, the insight chart card comprises iframe functionality for obtaining and displaying content relating to a particular asset and other content related to the particular asset. In some embodiments, the alarms card comprises information indicating a number of active alarms over a predetermined period of time for a particular asset. In some embodiments, the generic card comprises functionality for displaying tile data within a uniform look and feel, wherein the generic card is configured to function as a container for each type of tile. In some embodiments, the alerts card comprises information active alerts for a particular asset.

In some embodiments, the asset information comprises data associated with a relationship between at least two assets within the set of physical assets, wherein at least one tile within the set of tiles corresponds to the data associated with the relationship.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of some embodiments of the disclosure:

FIG. 12 details a non-limiting data flow according to some embodiments of FIGS. 4-11, in accordance with some embodiments of the present disclosure.

DESCRIPTION OF EMBODIMENTS

Figure 1:
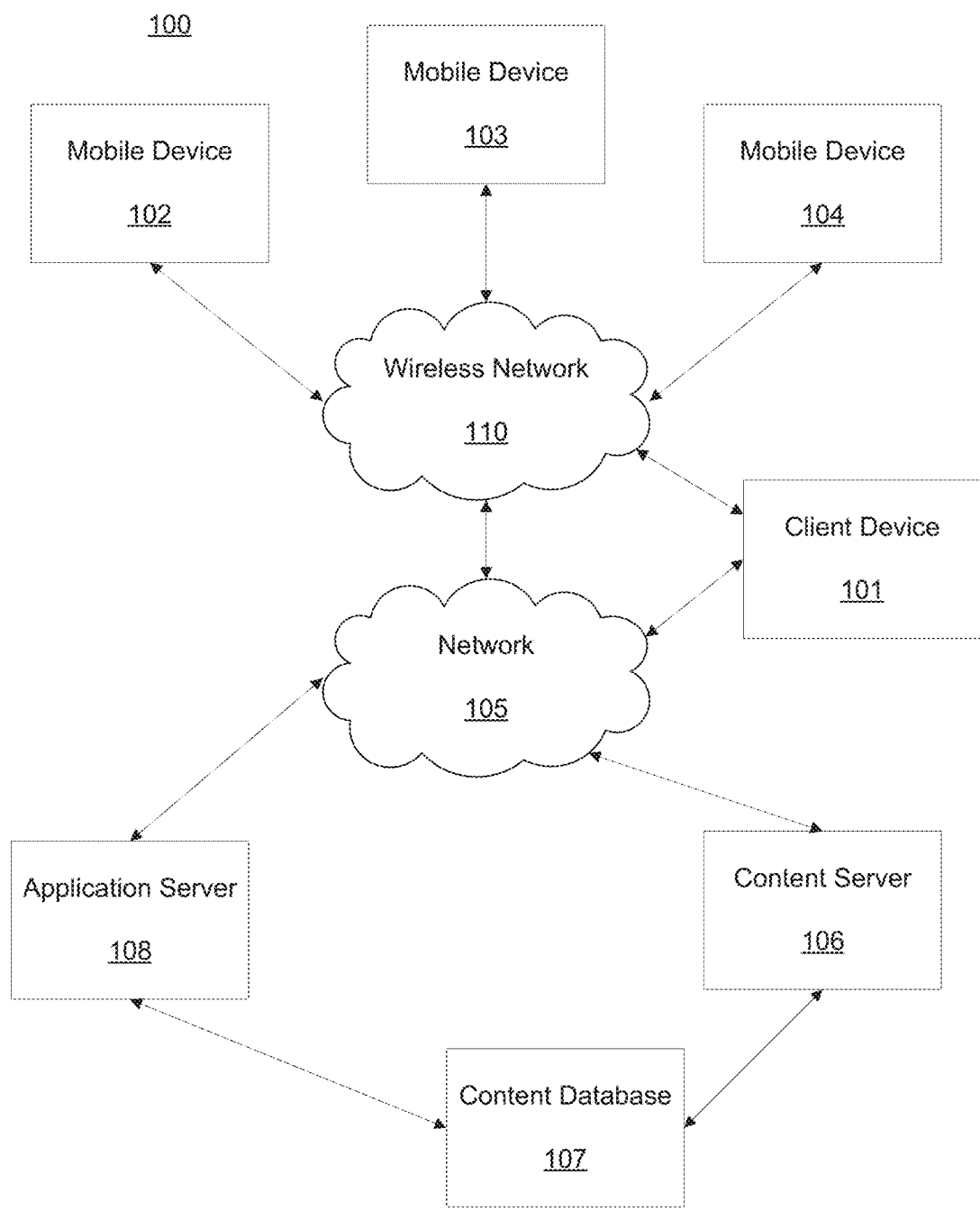
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Some embodiments of the present disclosure are described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some embodiments, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, cloud storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure, a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router (WR) mesh, or 2nd, 3rd, $4^{th}$ or $5^{th}$ generation (2G, 3G, 4G or 5G) cellular technology, Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

Certain embodiments will now be described in greater detail with reference to the figures. In general, with reference to FIG. 1, a system 100 in accordance with some embodiments of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106 and application (or "App") server 108.

Some embodiments of mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information, as discussed above.

Mobile devices 102-104 also may include at least one client application that is configured to receive content from another computing device. In some embodiments, mobile devices 102-104 may also communicate with non-mobile client devices, such as client device 101, or the like. In some embodiments, such communications may include sending and/or receiving messages, creating and uploading documents, searching for, viewing and/or sharing memes, photographs, digital images, audio clips, video clips, or any of a variety of other forms of communications.

Client devices 101-104 may be capable of sending or receiving signals, such as via a wired or wireless network, or may be capable of processing or storing signals, such as in memory as physical memory states, and may, therefore, operate as a server.

In some embodiments, wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104.

In some embodiments, network 105 is configured to couple content server 106, application server 108, or the like, with other computing devices, including, client device 101, and through wireless network 110 to mobile devices 102-104. Network 105 is enabled to employ any form of computer readable media or network for communicating information from one electronic device to another.

In some embodiments, the content server 106 may include a device that includes a configuration to provide any type or form of content via a network to another device. Devices that may operate as content server 106 include personal computers, desktop computers, multiprocessor systems, microprocessor-based or programmable consumer electronics, network PCs, servers, and the like. In some embodiments, content server 106 can further provide a variety of services that include, but are not limited to, email services, instant messaging (IM) services, streaming and/or downloading media services, search services, photo services, web services, social networking services, news services, third-party services, audio services, video services, SMS services, MMS services, FTP services, voice over IP (VOIP) services, or the like. Such services, for example the email services and email platform, can be provided via the message server 120.

In some embodiments, users are able to access services provided by servers 106 and 108. This may include in a non-limiting example, authentication servers, search servers, email servers, social networking services servers, SMS servers, IM servers, MMS servers, exchange servers, photo-sharing services servers, and travel services servers, via the network 105 using their various devices 101-104.

In some embodiments, application server 108, for example, can store various types of applications and application related information including application data and user profile information (e.g., identifying, generated and/or observed information associated with a user).

In some embodiments, content server 106 and app server 108 can store various types of data related to the content and services each provide, observe, identify, determine, generate, modify, retrieve and/or collect. Such data can be stored in an associated content database 107, as discussed in more detail below.

In some embodiments, server 106 and/or 108 can be embodied as a cloud server or configured for hosting cloud services, as discussed herein.

In some embodiments, the network 105 is also coupled with/connected to a Trusted Search Server (TSS) which can be utilized to render content in accordance with the embodiments discussed herein. Embodiments exist where the TSS functionality can be embodied within servers 106 and 108.

Moreover, although FIG. 1 illustrates servers 106 and 108 as single computing devices, respectively, the disclosure is not so limited. For example, one or more functions of servers 106 and 108 may be distributed across one or more distinct computing devices. Moreover, in some embodiments, servers 106 and 108 may be integrated into a single computing device, without departing from the scope of the present disclosure.

Additionally, while the illustrated embodiment in FIG. 1 depicts only servers 106 and 108, it should not be construed as limiting, as any type and number of servers can be included therein.

Figure 2:
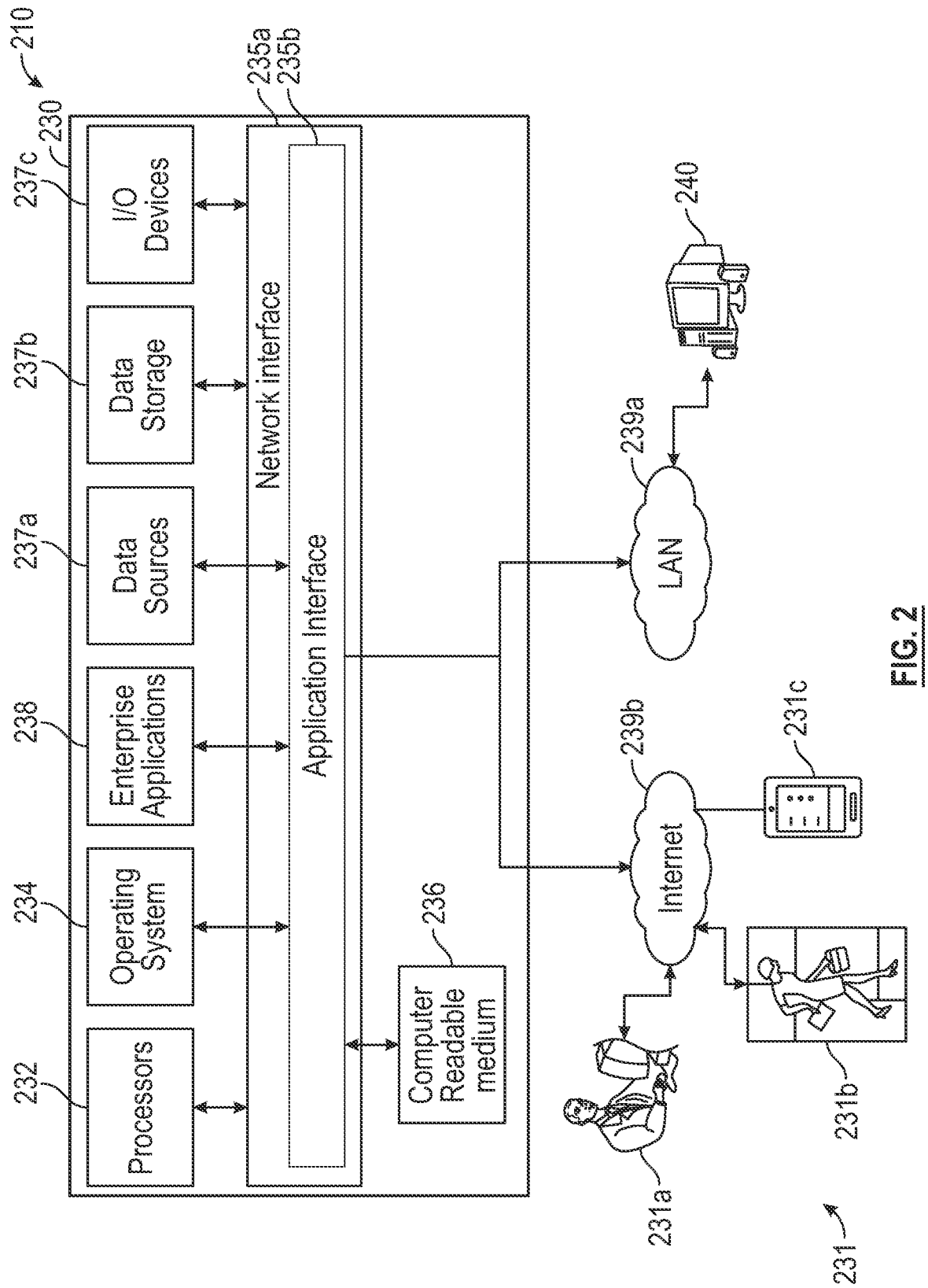
FIG. 2 is a schematic diagram illustrating an example of a network within which the systems and methods disclosed herein could be implemented according to some embodiments of the present disclosure.

Turning to FIG. 2, computer system 210 is depicted and is a non-limiting example embodiment of system 100 discussed above in relation to FIG. 1.

FIG. 2 illustrates a computer system 210 enabling or operating an embodiment of system 100 of FIG. 1 and/or environment 400 of FIG. 4, as discussed below. In some embodiments, computer system 210 can include and/or operate and/or process computer-executable code of one or more of the above-mentioned program logic, software modules, and/or systems. Further, in some embodiments, the computer system 210 can operate and/or display information within one or more graphical user interfaces. In some embodiments, the computer system 210 can comprise a cloud server and/or can be coupled to one or more cloud-based server systems.

In some embodiments, the system 210 can comprise at least one computing device 230 including at least one processor 232. In some embodiments, the at least one processor 232 can include a processor residing in, or coupled to, one or more server platforms. In some embodiments, the system 210 can include a network interface 235*a* and an application interface 235*b* coupled to the least one processor 232 capable of processing at least one operating system 234. Further, in some embodiments, the interfaces 235*a*, 235*b* coupled to at least one processor 232 can be configured to process one or more of the software modules 238 (e.g., such as enterprise applications). In some embodiments, the software modules 238 can include server-based software, and can operate to host at least one user account and/or at least one client account, and operating to transfer data between one or more of these accounts using the at least one processor 232.

With the above embodiments in mind, it should be understood that some embodiments can employ various computer-implemented operations involving data stored in computer systems. Moreover, the above-described databases and models described throughout can store analytical models and other data on computer-readable storage media within the system 210 and on computer-readable storage media coupled to the system 210. In addition, the above-described applications of the system can be stored on non-transitory computer-readable storage media within the system 210 and on computer-readable storage media coupled to the system 210.

In some embodiments, the system 210 can comprise at least one non-transitory computer readable medium 236 coupled to at least one data source 237*a*, and/or at least one data storage device 237*b*, and/or at least one input/output device 237*c*. In some embodiments, the disclosed systems and methods can be embodied as computer readable code on a computer readable medium 236. In some embodiments, the computer readable medium 236 can be any data storage device that can store data, which can thereafter be read by a computer system (such as the system 210). In some embodiments, the computer readable medium 236 can be any physical or material medium that can be used to tangibly store the desired information or data or instructions and which can be accessed by a computer or processor 232. In some embodiments, at least one of the software modules 238 can be configured within the system to output data to at least one user 231 via at least one graphical user interface rendered on at least one digital display.

In some embodiments, the non-transitory computer readable medium 236 can be distributed over a conventional computer network via the network interface 235*a* where the system embodied by the computer readable code can be stored and executed in a distributed fashion. For example, in some embodiments, one or more components of the system 210 can be coupled to send and/or receive data through a local area network ("LAN") 239*a* and/or an internet coupled network 239*b* (e.g., such as a wireless internet). In some further embodiments, the networks 239*a*, 239*b* can include wide area networks ("WAN"), direct connections (e.g., through a universal serial bus port), or other forms of computer-readable media 236, or any combination thereof.

Figure 3:
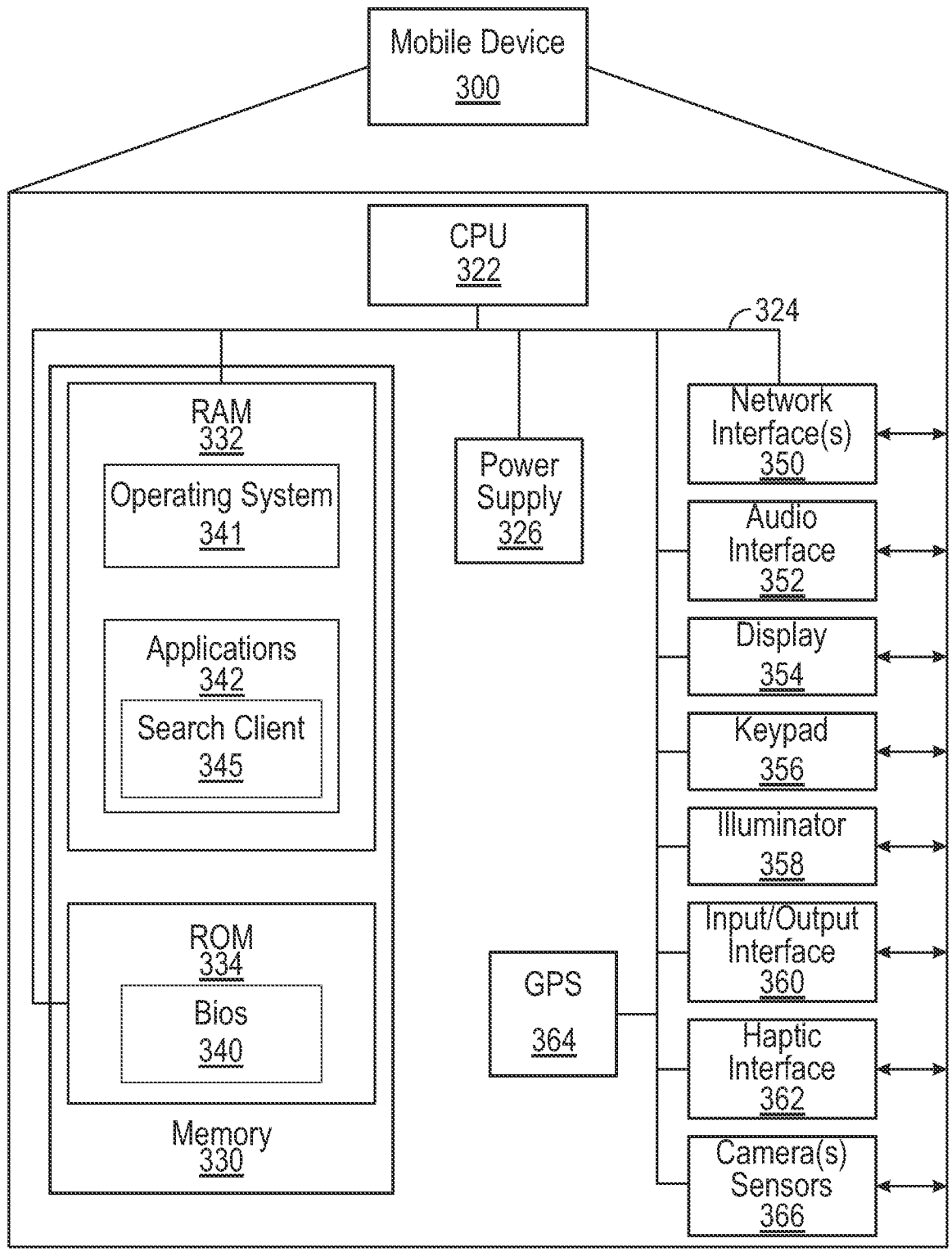
FIG. 3 depicts is a schematic diagram illustrating an example of client device according to some embodiments of the present disclosure.

In some embodiments, components of the networks 239*a*, 239*b* can include any number of user devices such as personal computers including for example desktop computers, and/or laptop computers, or any fixed, generally non-mobile internet appliances coupled through the LAN 239*a*. For example, some embodiments include personal computers 240*a* coupled through the LAN 239*a* that can be configured for any type of user including an administrator. Other embodiments can include personal computers coupled through network 239*b*. In some further embodiments, one or more components of the system 210 can be coupled to send or receive data through an internet network (e.g., such as network 239*b*). For example, some embodiments include at least one user 231 coupled wirelessly and accessing one or more software modules of the system including at least one enterprise application 238 via an input and output ("I/O") device 237*c*. In some other embodiments, the system 210 can enable at least one user 231 to be coupled to access enterprise applications 238 via an I/O device 237*c* through LAN 239*a*. In some embodiments, the user 231 can comprise a user 231*a* coupled to the system 210 using a desktop computer, and/or laptop computers, or any fixed, generally non-mobile internet appliances coupled through the internet 239*b*. In some embodiments, the user 231 can comprise a mobile user 231*b* coupled to the system 210. In some embodiments, the user 231*b* can use any mobile computing device 231*c* to wirelessly coupled to the system 210, including, but not limited to, personal digital assistants, and/or cellular phones, mobile phones, or smart phones, and/or pagers, and/or digital tablets, and/or fixed or mobile internet appliances FIG. 3 is a schematic diagram illustrating a client device showing an example embodiment of a client device that may be used within the present disclosure. Client device 300 may include many more or less components than those shown in FIG. 3. However, the components shown are sufficient to disclose an illustrative embodiment for implementing the present disclosure. Client device 300 may represent, for example, client devices discussed above in relation to FIGS. 1-2.

As shown in FIG. 3, in some embodiments, Client device 300 includes a processing unit (CPU) 322 in communication with a mass memory 330 via a bus 324. In some embodiments, Client device 300 also includes a power supply 326, one or more network interfaces 350, an audio interface 352, a display 354, a keypad 356, an illuminator 358, an input/output interface 360, a haptic interface 362, an optional global positioning systems (GPS) receiver 364 and a camera(s) or other optical, thermal or electromagnetic sensors 366. Device 300 can include one camera/sensor 366, or a plurality of cameras/sensors 366, as understood by those of skill in the art. Power supply 326 provides power to Client device 300.

Client device 300 may optionally communicate with a base station (not shown), or directly with another computing device. Network interface 350 is sometimes known as a transceiver, transceiving device, or network interface card (MC).

In some embodiments, audio interface 352 is arranged to produce and receive audio signals such as the sound of a human voice. Display 354 may be a liquid crystal display (LCD), gas plasma, light emitting diode (LED), or any other type of display used with a computing device. Display 354 may also include a touch sensitive screen arranged to receive input from an object such as a stylus or a digit from a human hand.

Keypad 356 may comprise any input device arranged to receive input from a user. Illuminator 358 may provide a status indication and/or provide light.

In some embodiments, client device 300 also comprises input/output interface 360 for communicating with external. Input/output interface 360 can utilize one or more communication technologies, such as USB, infrared, Bluetooth™, or the like. In some embodiments, haptic interface 362 is arranged to provide tactile feedback to a user of the client device.

Optional GPS transceiver 364 can determine the physical coordinates of Client device 300 on the surface of the Earth, which typically outputs a location as latitude and longitude values. GPS transceiver 364 can also employ other geo-positioning mechanisms, including, but not limited to, tri-angulation, assisted GPS (AGPS), E-OTD, CI, SAI, ETA, BSS or the like, to further determine the physical location of Client device 300 on the surface of the Earth. In some embodiments, however, Client device may through other components, provide other information that may be employed to determine a physical location of the device, including for example, a MAC address, Internet Protocol (IP) address, or the like.

In some embodiments, mass memory 330 includes a RAM 332, a ROM 334, and other storage means. Mass memory 330 illustrates another example of computer storage media for storage of information such as computer readable instructions, data structures, program modules or other data. Mass memory 330 stores a basic input/output system ("BIOS") 340 for controlling low-level operation of Client device 300. The mass memory also stores an operating system 341 for controlling the operation of Client device 300.

In some embodiments, memory 330 further includes one or more data stores, which can be utilized by Client device 300 to store, among other things, applications 342 and/or other information or data. For example, data stores may be employed to store information that describes various capabilities of Client device 300. The information may then be provided to another device based on any of a variety of events, including being sent as part of a header (e.g., index file of the HLS stream) during a communication, sent upon request, or the like. At least a portion of the capability information may also be stored on a disk drive or other storage medium (not shown) within Client device 300.

In some embodiments, applications 342 may include computer executable instructions which, when executed by Client device 300, transmit, receive, and/or otherwise process audio, video, images, and enable telecommunication with a server and/or another user of another client device. In some embodiments, applications 342 may further include search client 345 that is configured to send, to receive, and/or to otherwise process a search query and/or search result.

Having described the components of the general architecture employed within some embodiments, the components' general operation with respect to some embodiments will now be described below.

Figure 4:
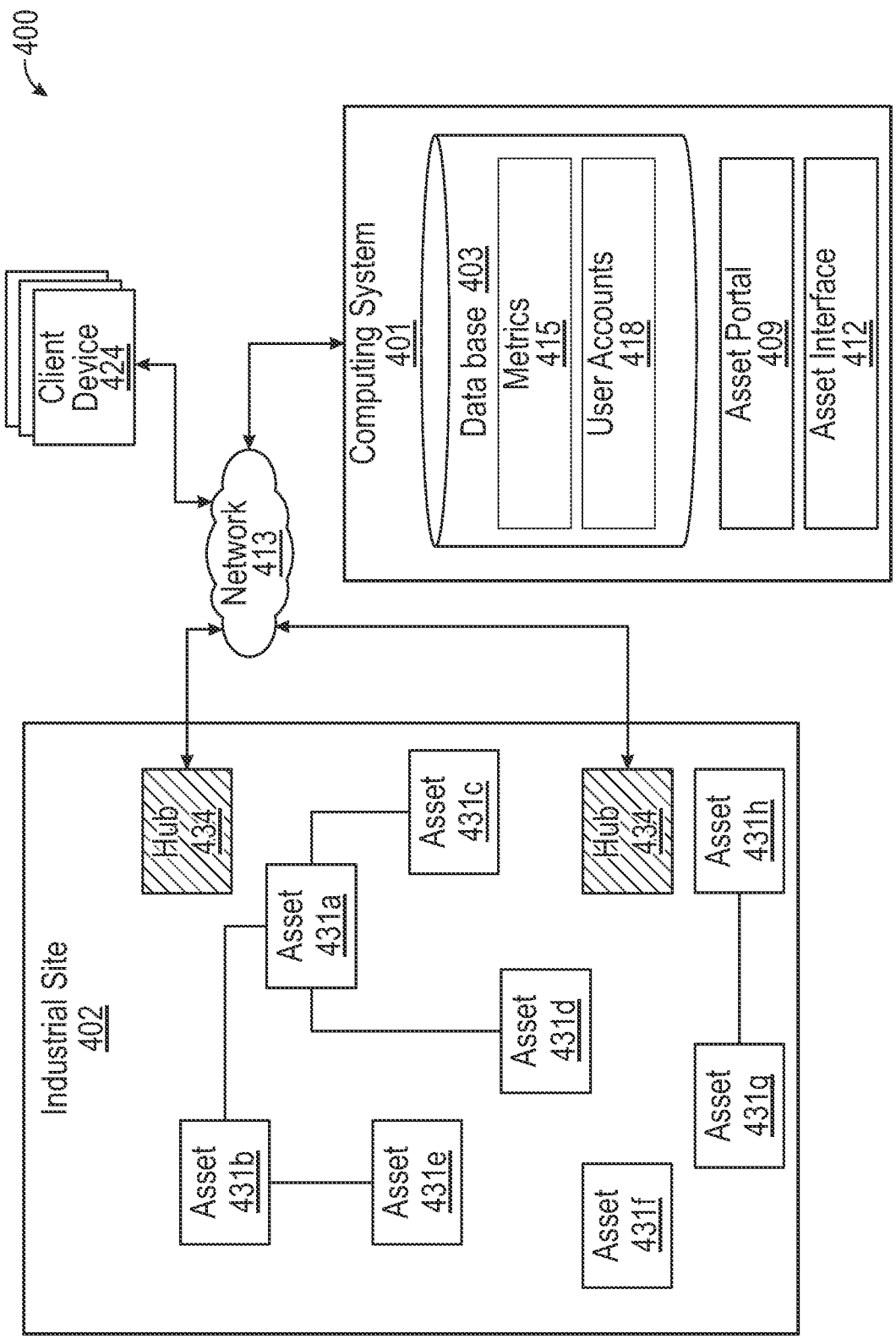
FIG. 4 illustrates a non-limiting computer environment enabling the management and visualization of asset data according to some embodiments of the present disclosure.

FIG. 4 illustrates a non-limiting example embodiment in which a computing environment 400 executes and hosts the disclosed systems and methods. Discussion herein will be based on the environment 400; however, it should not be construed as limiting, as any type of device(s) and/or network configuration can be utilized to implement the disclosed systems and methods (e.g., system 100 and/or system 210, for example).

In some embodiments, computing environment 400 can include a computing system 401 that includes a combination of hardware and software. In some embodiments, computing system 401 can include a database 403, an asset portal 409, and an asset interface 412. In some embodiments, computing system 401 can be connected to a network 413 such as the Internet, intranets, extranets, wide area networks (WANs), local area networks (LANs), wired networks, wireless networks, and the like, or any combination of two or more such networks.

Some embodiments of the computing system 401 can comprise, for example, a server computer or any other system providing computing capability. Alternatively, the computing system 401 can employ a plurality of computing devices that can be arranged, for example, in one or more server banks or computer banks or other arrangements. In some embodiments, computing devices can be located in a single installation or can be distributed among many different geographical locations. For example, the computing system 401 can include a plurality of computing devices that together can comprise a hosted computing resource, a grid computing resource and/or any other distributed computing arrangement. In some embodiments, computing system 401 can correspond to an elastic computing resource where the allotted capacity of processing, network, storage, or other computing-related resources can vary over time. In some embodiments, computing system 401 can implement one or more virtual machines that use the resources of the computing system 401.

In some embodiments, applications and/or other functionality can be executed in the computing system 401. In some embodiments, various data are stored in the database 403 or other memory that is accessible to the computing system 401. In some embodiments, database 403 can represent one or more databases 403.

In some embodiments, components executed on the computing system 401 can include asset portal 409 and asset interface 412, which are components that access, modify, and/or generate the contents of the database 403. In some embodiments, asset portal 409 and asset interface can be stored in memory of a device at site 402, device 424 and/or system 401.

In some embodiments, asset portal 409 can generate a user interface that allows users to view and navigate data. Some embodiments of such interface and capabilities provided via the interface are discussed in more detail below in relation to FIGS. 5-12 below.

In some embodiments, asset portal 409 can be implemented as a server-side application that generates web-based documents. In some embodiments, such documents can be hypertext markup language (HTML) documents dynamic HTML documents, extended markup language (XML) documents, or other documents or data that can be decoded and rendered to present data to a user. In some embodiments, asset interface 412 can include software that sends and receives data packets or other information being communicated over a network 413.

In some embodiments, data stored in the database 403 can include metrics 415 and user accounts 418. In some embodiments, metrics 415 can include information collected by the asset interface 412. In some embodiments, metrics 415 can be an aggregated data log of asset information received by the asset interface 412 for a specific industrial site 402. In some embodiments, user accounts 418 can include information to register a user, user credentials, user preferences, demographics, details about a user's subscription, and the like, or some combination thereof. In some embodiments, user accounts 418 can include information to provide a customized user interface.

In some embodiments, computing environment 400 can comprise an industrial site 402 or any other facility or site. In some embodiments, industrial site 402 can be, for example, a chemical plant, food and beverage plant, infrastructure facility, laboratory, marine facility, mining site, oil/gas facility, power/utility facility, pulp and paper factory, manufacturing facility, metal fabrication site, a water/waste facility, and the like.

In some embodiments, industrial site 402 can include several assets 431. In some embodiments, asset 431 can be a device or system that provides a specific function. In some embodiments, an asset can be, for example, a tool, a machine, a computing module, a structure, a vehicle, or an industrial component. In some embodiments, assets 431 can be configured to work in conjunction with other assets 431, and can be arranged in an ordered chain.

In some embodiments, according to FIG. 4, by way of a non-limiting example, a first asset 431*a* can work with several other assets such as a second asset 431*b*, a third asset 431*c*, and a fourth asset 431*c*, each of which depend on the first asset 431*a*. In some embodiments, the second asset can control a fifth asset 431*e*. In some embodiments, seventh asset 431*f* can be isolated such that it has no control over any other assets 431 or where no other assets depend on the seventh asset. In some embodiments, eighth asset 431*g* can control ninth asset 431*h*. In some embodiments, assets 431 can work in conjunction together, they can communicate with one another by sending data packets or messages.

In some embodiments, one or more hubs 434 can be included in the industrial site 402. In some embodiments, a hub can be integrated, attached, or otherwise in communication with one or more assets 431. In some embodiments, a hub 434 can include a transmitter and a receiver to send data over the network 413. In some embodiments, the data can include information about an asset. In some embodiments, hub 434 can communicate with one or more assets and can be coupled to the network 413 to communicate with the asset interface 412.

In some embodiments, computing environment 400 can include one or more client device(s) 424. In some embodiments, client device 424 can allow a user to interact with components of computing system 401 over network 402. In some embodiments, client device 424 can be a cell phone, laptop, personal computer, mobile device, or the like used by a user. In some embodiments, client device 424 can include an application such as a web browser or mobile application that can communicate with asset portal 409 to access, manipulate, edit, or view information about industrial site 402. In some embodiments, the client device can render the user interface using a browser or dedicated application.

Some embodiments include a general description of the operation and components of computing system 400 that can be provided.

In some embodiments, assets 431 can be in an industrial environment and can be organized in a hierarchical structure, with parent and child relationship between assets. In some embodiments, this can facilitate in automation, such as a property of a parent asset that can apply to all children assets 431, and in analysis of asset 431, such as energy consumed by asset 431 along with all its children assets, during a shift. In some embodiments, information can be tracked for a given asset 431 that can affect asset experiences, for example, unscheduled downtime, failure, defects, maintenance issues, stress, and unproductivity. In some embodiments, non-limiting examples of asset information can include runtime, energy expended, quantification of an asset output or input, operational status, and the like. In some embodiments, asset information can be communicated over network 413 to computing system 401. In some embodiments, computing system 401 can include asset interface 412 to receive asset information over network 413. In some embodiments, information can be stored as metrics 415 for assets 431 of a particular industrial site 402.

In some embodiments, user can track the status of industrial site 402 by gaining insight into the manner in which assets are operating. In some embodiments, the user can use client device 424 to log into asset portal 109. In some embodiments, asset portal 409 can authenticate and authorize a user to access the portal using information from a corresponding user account 418 (e.g., login credentials). In some embodiments, upon user access asset portal 409 can generate a user interface and transmit the user interface to client device 424 over network 413. In some embodiments, user interface can be an encoded webpage document that can be received, decoded, and rendered for display at client device 424.

In some embodiments, the user interface can include a hierarchy of assets 431 that users can navigate. For example, a child asset 431*e* may communicate with a parent asset 431*b* and transmit data packets to the parent asset 431*e*. The data packet may include an asset identifier, asset location, or other information identifying the asset or providing information about the asset. The parent asset 431*e* may also send a data packet to a grandparent 431*a* asset indicating the parent asset's 431*b* asset identifier, asset location, or other information identifying the asset or providing information about the asset. In addition, the parent asset 431*b* may include the data received from a child asset 431*e* when communicating with a grandparent asset 431*a*.

The grandparent asset 431*a* transmits a data packet to the asset interface 412 including the information received from any and all parent assets 431*b*, 431*c*, 431*d*. This information is stored as metrics 415. The asset portal 409 analyzes the data packets received from various assets to determine a hierarchy of assets 431. Thus, the asset portal 409 identifies the child dependencies of assets to construct a hierarchy. Through the use of asset identifiers and the transmission of data packets between child/parent assets 431, the asset portal 409 generates an asset hierarchy. In some embodiments, relationships between assets can be stored as an asset hierarchy. In some embodiments, asset portal 409 can generate a user interface that displays the hierarchical path between assets.

In some embodiments, one or more hierarchies of assets can be stored in data base 403 and can be periodically updated. In some embodiments, hierarchy of assets can be used to generate a unified asset tree. In some embodiments, user interface can include a unified asset tree that a user can navigate. In some embodiments, a user can select a specific asset 431 through a rendered user interface. In some embodiments, the asset can be positioned as desired within the unified asset tree.

In response to an asset selection, the user interface can automatically compose a collection of relevant metrics 415 arranged in order of relevance and priority. In some embodiments, each of the metrics 415 can be automatically displayed to depict relevant metrics cumulatively for all children assets under the selected asset. In some embodiments, a user may select the second asset 431b via the user interface. In response to the selection, the asset portal 409 can calculate metrics associated with the second asset 431b and any children assets, such as the fifth asset 431e. In some embodiments, asset portal 409 can also aggregate or otherwise combine the metrics for the second asset 431b and fifth asset 431e to generate a cumulate metric 415. In some embodiments, if the metric is energy consumption, the cumulative metric 415 can be the combined energy consumption of the second asset 431b and fifth asset 431e.

In some embodiments, as discussed in more detail below, the display can show metrics that are relevant for a level of asset hierarchy and/or for the particular user. In some embodiments, a user can select a particular hierarchical tier (e.g., grandparent assets, parent assets, children assets, and the like). In some embodiments, the metrics associated with that tier can be included in the user interface.

Some embodiments comprise the use of generating tiles to display the metrics in the user interface. In some embodiments, a tile can be an electronic card that is interactive and displayable within a graphical user interface (GUI) of a device or application. In some embodiments, the tile can be a modular infographic that visually depicts a piece of data. In some embodiments, a tile can also refer to a card datagram, or other self-contained graphic. In some embodiments, a tile can be implemented as a container that is embedded in a webpage document. In some embodiments, the container can invoke one or more server-side functions to obtain data over network 413 and output it in the tile. In some embodiments, server-side functions can include refreshing the data and conveying user input if a user interacts with the tile. In some embodiments, a container that implements the tile can include code to adjust the way the tile is presented in the user interface. In some embodiments, interaction with the tile can cause retrieval of additional, updated and or any other type of supplemental information related to what is already being displayed. In some embodiments, the container can adjust the color, font, or other characteristics that affect the way data are represented in the tile. In some embodiments, the container can also adjust the size of the tile depending on the number of tiles in the user interface or the viewing mode of the user interface After a user selects asset 431, the user interface can be updated to include one or more tiles that each present specific data pertaining to the selected asset 431. In some embodiments, tiles can be prioritized or hidden depending on their relevancy. In some embodiments, a user can navigate the asset hierarchy while all the metrics are automatically updated to reflect the current asset and all children. In some embodiments, the user interface can be dynamically updated to reflect new, incoming information received by the asset interface 412. In some embodiments, a user can view a specific metrics detail for a specific metric. In some embodiments, the system can automatically update the metric tiles. In some embodiments, the user interface can consistently apply asset context.

In some embodiments, as discussed below in more detail, the user interface can provide asset based navigation. In some embodiments, asset based navigation can correspond to dynamic composition of relevant tiles. In some embodiments, asset based navigation data in tiles can be based cumulatively on the current asset and all children. In some embodiments, asset based navigation can automatically refresh tiles periodically so that the data is kept up to date.

Figure 5:
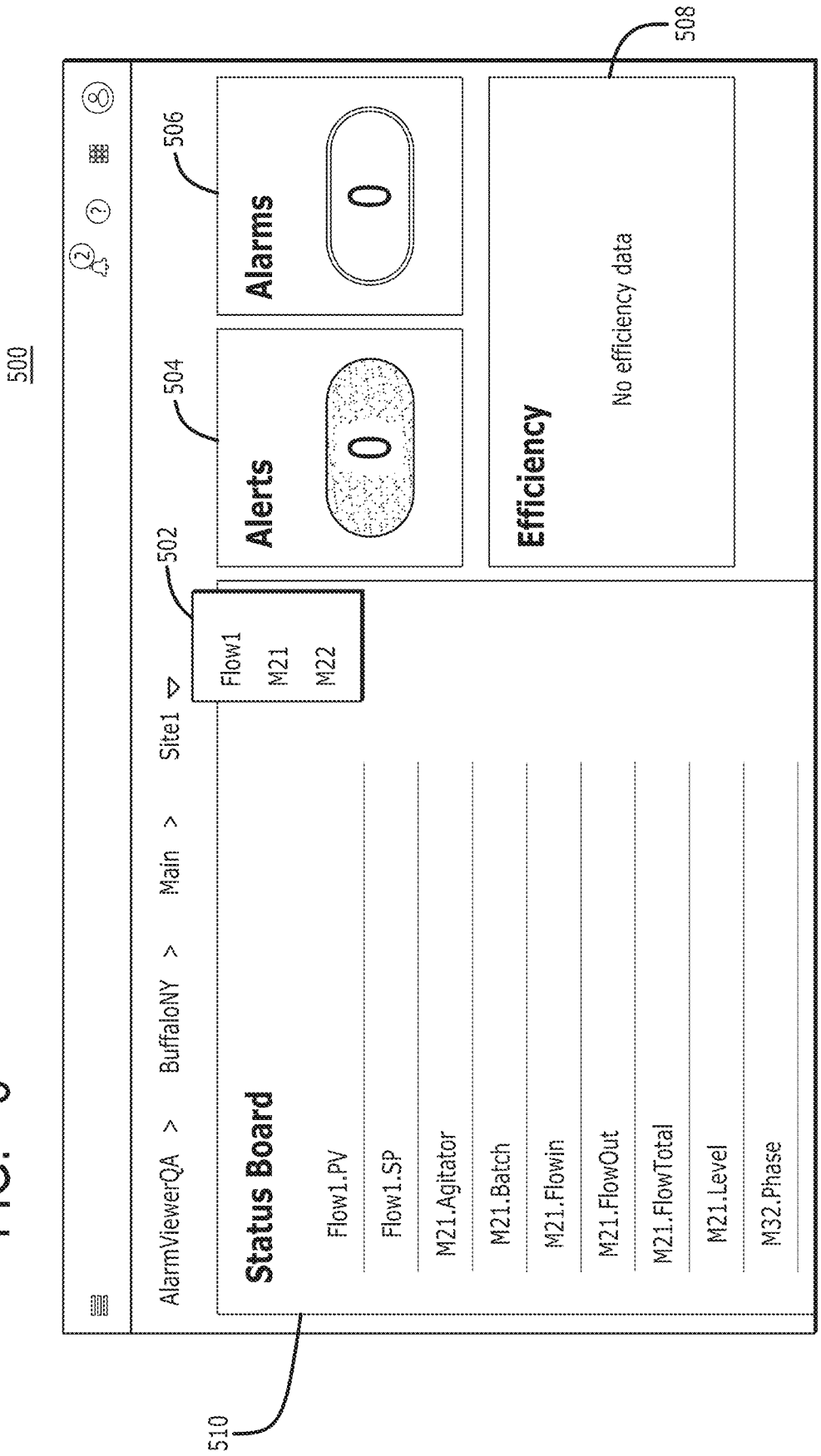
FIG. 5 illustrates a non-limiting user interface generated and displayed in the computing environment of FIG. 4, according to some embodiments of the present disclosure.

FIG. 5 illustrates a non-limiting example of a user interface 500. In some embodiments, user interface 500 is generated and displayed in the computing environment 400 of FIG. 4, according to some embodiments. In some embodiments, user interface 500 can present an asset page. In some embodiments, an asset page can display relevant information about equipment, locations, and the like. In some embodiments, an asset page can present dedicated tiles for specific metrics such that each metric is represented in a corresponding tile (or electronic card). For example, the asset page displayed within interface 500 can display an alert tile 504, alarms tile 506 and efficiency tile 508, as discussed in more detail below.

In some embodiments, the asset page can include a unified asset tree that can be expanded or collapsed. An example of this functionality is depicted in FIG. 5 via interface object 502, which is embodied, in this example, an interactive drop down menu where individual assets and their relationship can be displayed and selected.

In some embodiments, asset portal 409 can maintain an asset hierarchy that reflects the parent/child relationships among assets 431 in a specific industrial site. This hierarchy is represented as a unified asset tree, where individual assets or hierarchical levels can be selected.

In some embodiments, an asset page can support responsive designs in various modes, for example, tablet mode and mobile mode. In some embodiments, mobile mode comprises all cards that can be displayed occupying the entire width of the screen. In some embodiments, tablet mode can occupy the entire width of the grid screen. In some embodiments, the card can occupy half or more than half of the width of grid screen.

Some embodiments include asset card behaviors for each card. In some embodiments, each card can independently invoke a refresh service to update the information depicted in the card. In some embodiments, when the asset page initially loads, each card within the asset page can be refreshed. In some embodiments, the order in which each card refreshes upon the initial load can be predetermined. In some embodiments, each card can refresh from left to right and from top to bottom. In some embodiments, each card can be configured to request a refresh service to refresh on an independent basis. In some embodiments, each card can manage its own refresh timing. In some embodiments, the cards can issue a request to refresh and enter a queue. In some embodiments, refreshing of cards can occur in a serial manner where one refresh can be handled at a time until the queue is exhausted.

In some embodiments, each card can indicate the time it was last refreshed or otherwise updated. In some embodiments, the last updated text can be displayed at the bottom of the card, only in the case that the card has not been updated by the expected time. In some embodiments, each card can track its refresh history. In some embodiments, the card can maintain a timer indicating when it needs to refresh next. In some embodiments, if the limit is exceeded it can report the last updated text to the generic card to be displayed. In some embodiments, the text can be in the form of "Last updated {date/time}". In some embodiments, when the day is the current day, the text can be displayed in an hour : minute am/pm format, for example: 9:32 pm. In some embodiments, when the day is different, the text can be displayed in a full date and time format, for example: 8/2/2019 8:00 am.

Figure 6:
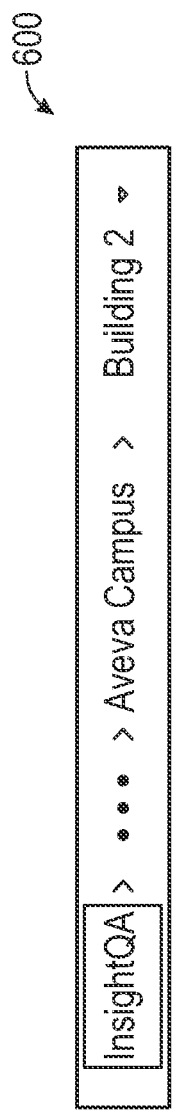
FIG. 6 illustrates a non-limiting embodiment of a breadcrumb control included in a user interface in the computing environment of FIG. 4, according to some embodiments of the present disclosure.

FIG. 6 illustrates a breadcrumb control 600 included in a user interface 500 in the computing environment 400 of FIG. 4, according to some embodiments. In some embodiments, a breadcrumb can allow users to keep track and maintain awareness of their locations within the hierarchy of assets. In some embodiments, the breadcrumb can represent a path to the selected node in the user interface 500, (e.g., Root ->Parent ->Child ->Grandchild ->Great-Grandchild). As shown in FIG. 6, breadcrumb control 600 tracks assets along a hierarchy that can be organized according to location. In some embodiments, particular industrial site 402 can include several campuses, each campus having a building, each building having different rooms, and each room having different zones.

In some embodiments, each node in the path can provide a button with the name of the node. In some embodiments, users can click the node button to select that specific node and the control can update accordingly. In some embodiments, each node button can be delimited by an arrow button '>'. In some embodiments, the selected node (i.e. last node in the control) can have one or more children. In some embodiments, a user can select the arrow button to display a dropdown list of children under the preceding element in the hierarchy. In some embodiments, children nodes can be selected by selecting the corresponding element in the dropdown list. In some embodiments, a down arrow button can be displayed with the same behavior as the arrow button.

In some embodiments, the number of nodes in the breadcrumb can exceed a predetermined amount, for example, four. In some embodiments, when the nodes in the breadcrumb exceed the predetermined amount (e.g., 4), all nodes between the root and the last two elements can be combined into an ellipsis button. In some embodiments, when a user clicks the ellipsis button, the user can select the parent of the second to last node displayed in the path. For example, if the path was A/B/C/D/E/F, the breadcrumb can appear as A>. . . >E>F, and pressing the ellipsis button can select the path A/B/C/D.

Figure 7:
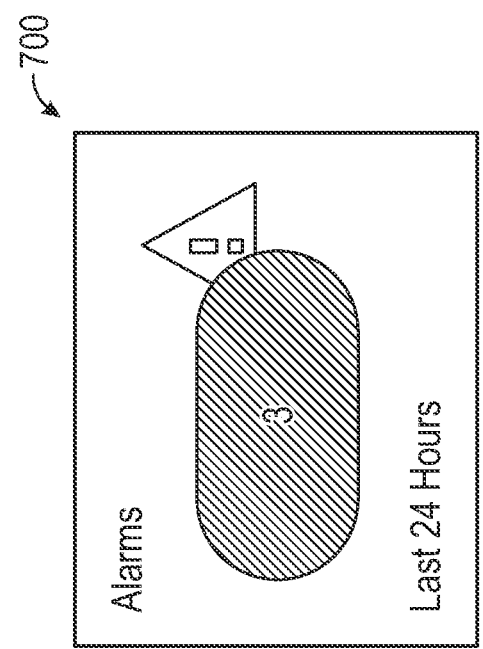
FIG. 7 illustrates a non-limiting embodiment of an alarms number card included in a user interface in the computing environment of FIG. 4, according to some embodiments of the present disclosure.

FIG. 7 illustrates an alarms number card 700 included in a user interface 500 in the computing environment 400 of FIG. 4, according to some embodiments. In some embodiments, an alarms number card 400 can display a number of active alarms. In some embodiments, alarms number card 700 can display a number of active alarms in a predetermined period of time, for example, a 24-hour period. In some embodiments, alarms number card 700 can refresh automatically itself invoking a refresh service. In some embodiments, alarms number card 700 can use the open style and/or a red warning icon. In some embodiments alarms number card 700 can display a spinner when loading data.

In some embodiments, alerts number card 702 can display all active alerts accessible to the user for selected asset 431 and/or for all children assets associated with the selected asset. In some embodiments, alerts number card 702 can refresh on a periodic basis, for example, once a minute. In some embodiments, alerts number card 702 can be used the fill style and a bell icon. In some embodiments, alerts number card 702 can display a spinner when loading data. In some embodiments, when a user selects the alerts number card 702, alerts configuring for the selected asset can be shown.

Figure 8:
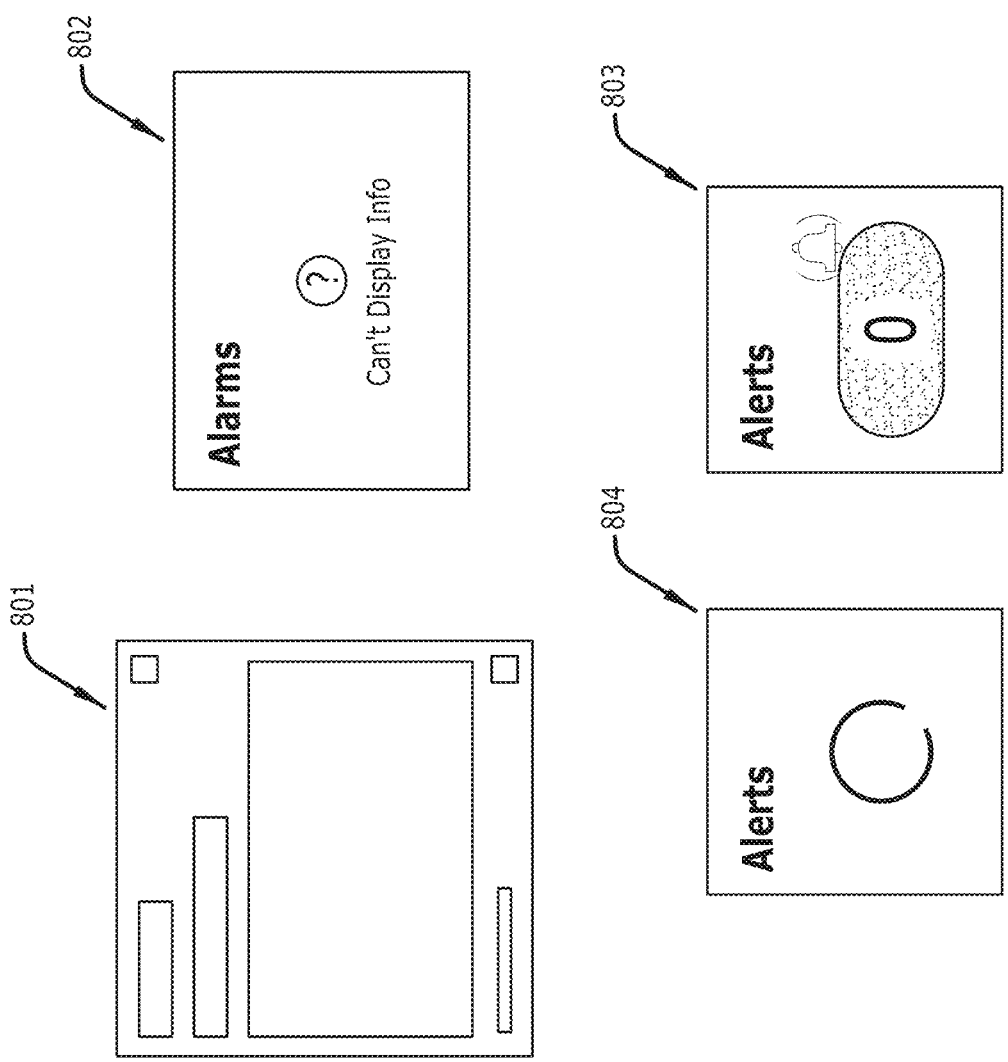
FIG. 8 illustrates non-limiting embodiments of various cards capable of being included in a user interface in the computing environment of FIG. 4, according to some embodiments of the present disclosure.

FIG. 8 illustrates various cards included in a user interface 500 in the computing environment 400 of FIG. 4, according to some embodiments. FIG. 8 depicts an example of a generic card 801, an alarm card 802, a first alert card 803, and a second alert card 804.

In some embodiments, a generic card 801 can be implemented by a container that includes card controls and software that allows the card to be dynamically updated. In some embodiments, a card can be considered generic when it serves as a template to implement a specific card such as an alarm card or alert card. In some embodiments, generic card 801 can be configured to host a header, sub header, footer, and top right and bottom left buttons. In some embodiments, generic cards can be formatted in a specific manner to maintain a uniform look and feel as each generic card is configured to be specialized. In some embodiments, generic card 801 can support a common error state and progress indicator which any consuming control may use.

In some embodiments, generic card 801 can be associated with code that is configured to communicate with the asset portal 409 to obtain content to be displayed in the card. In some embodiments, if the content is a number, the number can exceed 999. In some embodiments, when the number exceeds 999, the string can be displayed as "999+". In some embodiments, user can hover over the number to get a native tooltip. In some embodiments, native tooltip can display the actual number. In some embodiments, the card can support an 'open' or 'filled' style for the number oval. In some embodiments, the card can support an icon and icon color which is controlled by the generic.

In some embodiments, generic card 801 can use an iframe to obtain content relating to a selected asset's location and/or other content related to the selected asset (e.g., supplemental information). In some embodiments, content can be a singular piece of data or a list of data. In some embodiments, the content can be chosen based on order of priority. In some embodiments, a user's preference for priority can be stored in a corresponding user account 418. When there are several cards to be presented, the priority can be configured in an order ranging from graphic, map, status, column, summary bar, composite chart, and line chart. In some embodiments, the charts can also be prioritized according to most recently used or accessed.

In some embodiments, if the card is unable to obtain content, the asset location and its descendants, a status board can be displayed (see item 510 of FIG. 5). In some embodiments, the top 30 tags and their descendants can be displayed sorted by name. In some embodiments, if there are no tags or contents associated with a given location, a message can display notifying the user that there was no data available.

In some embodiments, cards can include a chart, where the chart can be clicked. In some embodiments, the chart can be drilled down into a single chart view for the content that it represents. In some embodiments, the content of the chart can be displayed in a tile view across one or more tiles. In some embodiments, a spinner can be displayed when loading data as shown in the second alert card 804.

In some embodiments, if there are no contents or tags available, the chart can be displayed in a no data view. In some embodiments, the chart can use a fixed time range. In some embodiments, no refreshes can be issued from the insight chart card and will not display the last updated text.

FIG. 8 illustrates how generic card 801 can be configured to be a specialized card such as an alarms card 802 or an alert card 803, 804.

Figure 9:
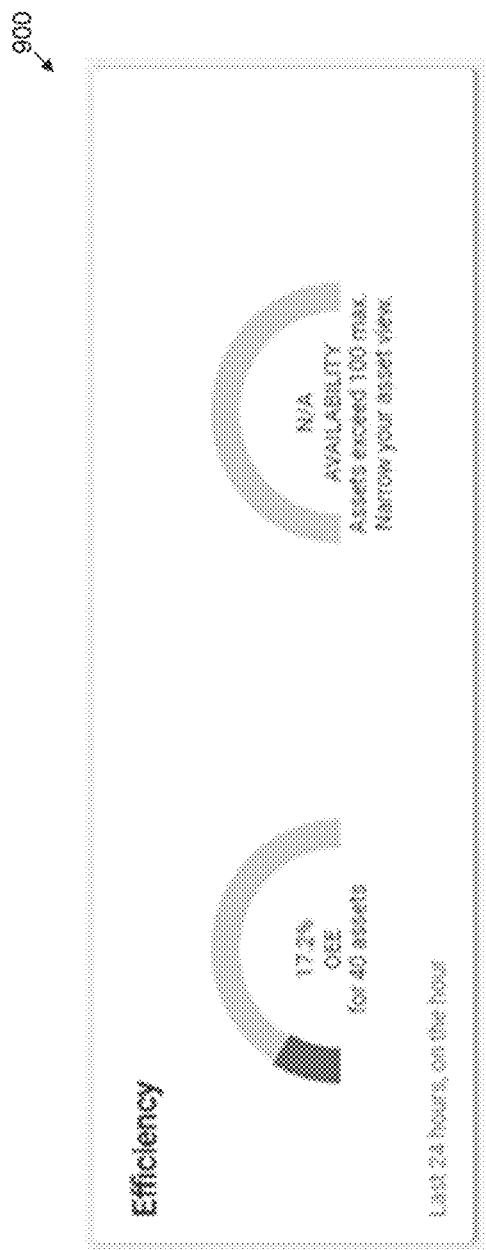
FIG. 9 illustrates a non-limiting embodiment of a Manufacturing Execution System (MES) card included in a user interface in the computing environment of FIG. 4, according to some embodiments of the present disclosure.

FIG. 9 illustrates a Manufacturing Execution System ("MES") card included in a user interface 500 in the computing environment 400 of FIG. 4, according to some embodiments. In some embodiments, a IVIES card can be based on generic card 801 and specializing it to provide MES data or other efficiency data relating to an asset 431. In some embodiments, a IVIES card can display IVIES data associated to the selected asset 431 or location of the asset 431. In some embodiments, a MES card can use text and gauges. In some embodiments, a IVIES card can display overall equipment effectiveness (OEE) for the OEE-enabled equipment. In some embodiments, a MES card can display availability information for non-OEE-enabled equipment associated with a selected asset or asset location. In some embodiments, the location can be a leaf node. In some embodiments, the MES card can display OEE or availability information for the selected asset 431. In some embodiments, a user can click on the IVIES card to drill through to the MES OEE analysis page. In some embodiments, when no data is available, a "no data" message can be displayed. In some embodiments, a spinner can be displayed when loading data.

In some embodiments, if the number of OEE-enabled equipment exceeds a predetermined number (e.g., 100) or the number of non-OEE-enabled equipment exceeds a predetermined number for a selected asset, no summarized data will be displayed, and an informational message will be displayed instead. In some embodiments, the informational message can include a warning icon. In some embodiments, the warning icon can provide a user with knowledge that a problem has occurred on the control.

In some embodiments, the data presented in the IVIES card can be summarized for a predetermined amount of time such as, for example, 24 hours. In some embodiments, the end time can be displayed at the top of the current hour. For example: if the current time is July 5 1:35 pm, the time range for the summarized data can be between July 4 1:00 pm and July 5 1:00pm. In some embodiments, data can be auto-refreshed according to a predetermined period of time.

Figure 10:
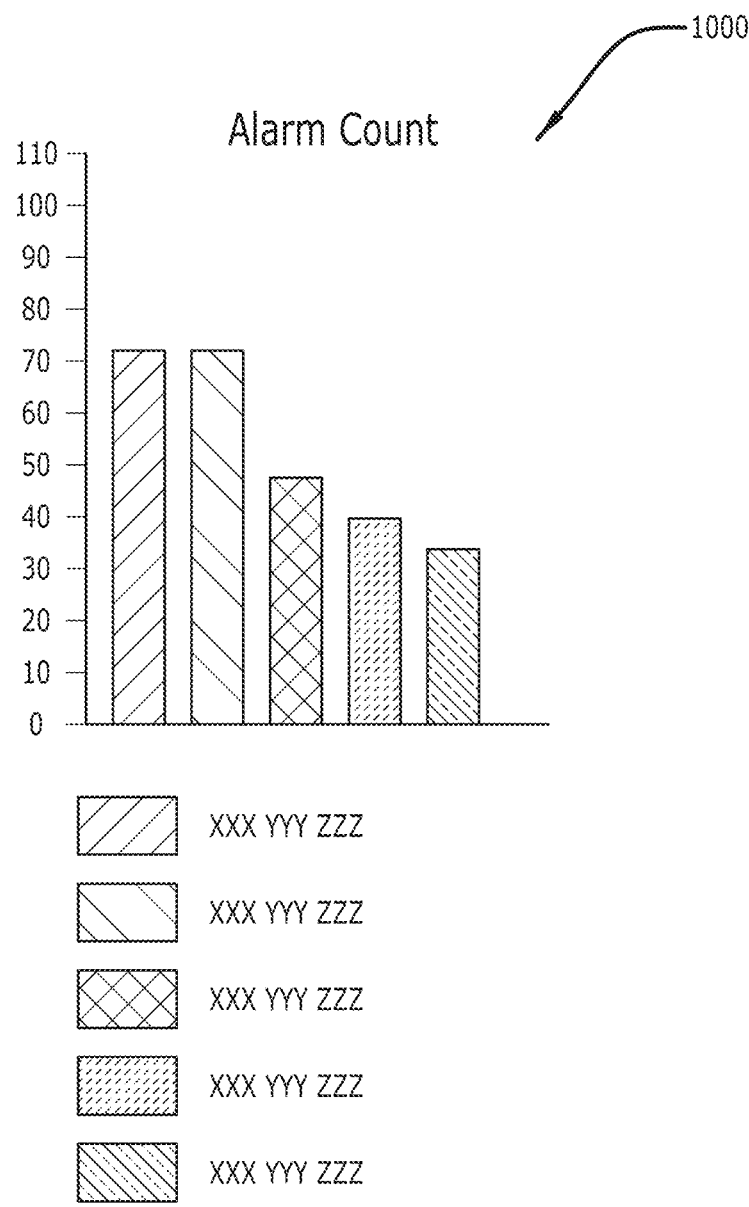
FIG. 10 illustrates a non-limiting embodiment of a pareto chart card included in a user interface in the computing environment of FIG. 4, according to some embodiments of the present disclosure.

FIG. 10 illustrates a pareto chart card 1000 included in a user interface 500 in the computing environment 400 of FIG. 4, according to some embodiments. In some embodiments, pareto chart card 1000, as illustrated, can display a number or metrics of data related to alarms (or critical issues) for particular assets or a location(s). In some embodiments, the user interface can limit the number of columns in the pareto chart 1000 to a predetermined number. In some embodiments, the columns can be arranged in descending order. In some embodiments, one column at a predetermined position (e.g., the last position), can reflect a cumulative amount of data while the remaining columns represent constituent pieces of data that make up the cumulative amount of data. In some embodiments, assuming there are ten columns, the first nine columns can reflect data in descending order while the last, tenth column represents the cumulative data. In some embodiments, if the number of columns fall below a threshold amount, then the column representing cumulative data is not displayed so that the remaining columns can share the chart width. In some embodiments, pareto chart 700 can display a title at the top describing the contained data.

In some embodiments, pareto chart card 1000 can have a Y axis marked with numbered ticks. In some embodiments, the pareto chart card 1000 can include a legend that has a legend item per column depicted. In some embodiments, the legend items can contain a color key rectangle corresponding to the color of columns in the chart. In some embodiments, the legend items can contain a label of the ID or name of the current items represented.

In some embodiments, a pareto chart card 1000 can display multiple columns in desktop view and can display a few number of columns in mobile view. In some embodiments, the pareto chart card can display a legend area. In some embodiments, the legend area can provide various items. In some embodiments, the legend items can run longer than their column and will be truncated with ellipsis. In some embodiments, a tooltip can reveal the full name of the legend item in response to user input, for example, hovering over the legend using a curser. In some embodiments, smart text wrapping can be used to shorten the names of legend items when there are common prefixes or suffixes between all items. In some embodiments, clicking the chart may drill down to the alarms page for the given location or for a selected asset. In some embodiments, a spinner or other indicator can be displayed when loading data.

Figure 11:
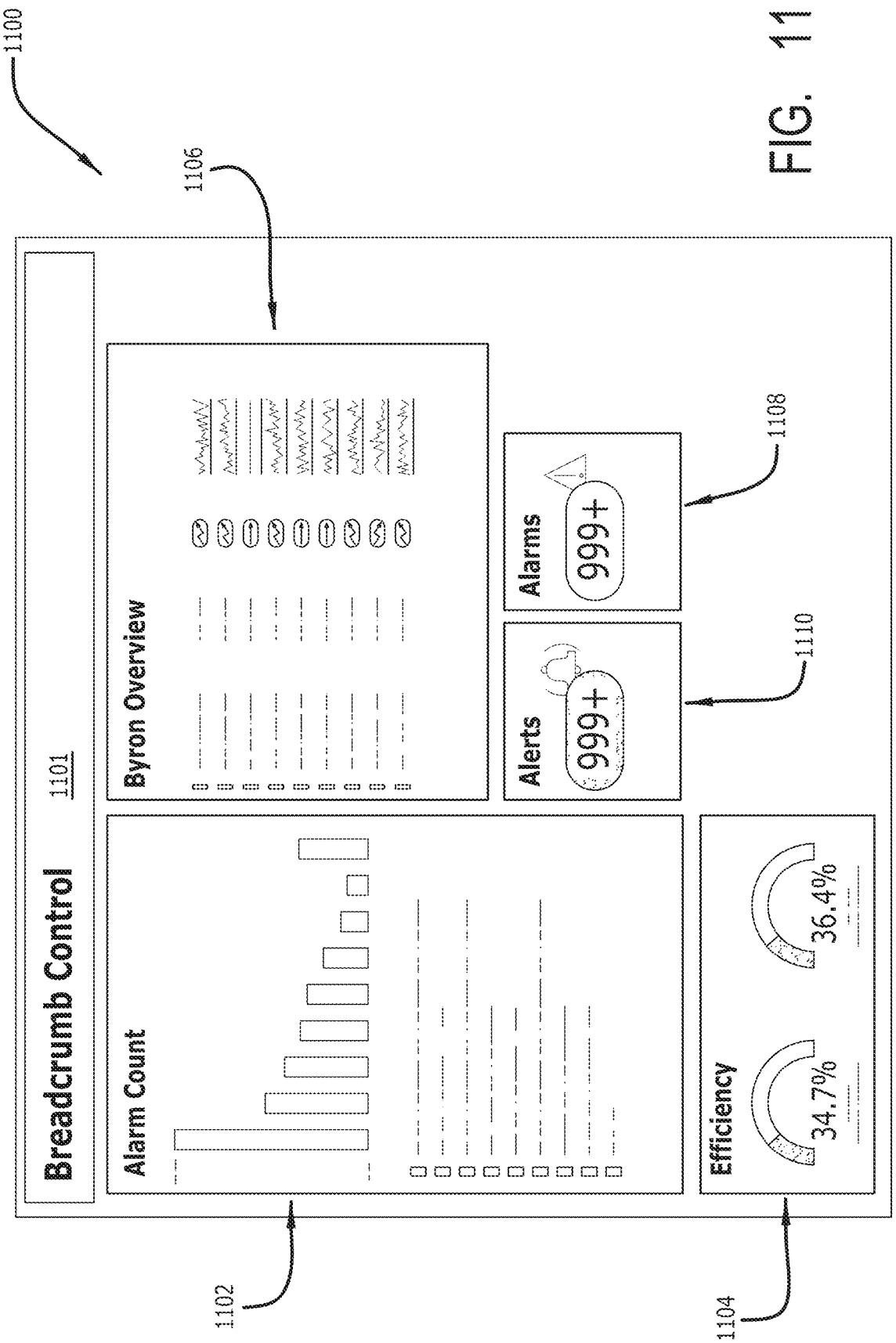
FIG. 11 illustrates a non-limiting example embodiment of another user interface in the computing environment of FIG. 4, according to some embodiments of the present disclosure.

FIG. 11 illustrates an example of another user interface 1100 in the computing environment 400 of FIG. 4, according to some embodiments. In some embodiments, user interface 1100 can include breadcrumb control 1101. In some embodiments, user interface 1100 can display how several generic cards have been configured to serve as specialized cards. In some embodiments, these specialized cards can include, for example, a pareto card 1102, a MES card 1104, an insight chart card 1106, an alarms card 1108 and an alerts card 1110. In some embodiments, these cards can be arranged according to priority defined by a user preference. In some embodiments, the cards can be determined according to a selected asset or a selected tier along an asset hierarchy. In some embodiments, the asset hierarchy can be defined according to asset location.

Turning now to FIG. 12, Process 1200 details a non-limiting embodiment according to some embodiments for generating and updating a user interface (e.g., interface 500 and/or 1100, for example) and the tiles displayed therein (e.g., items 502-510, 600, 700, 801-804, 900, 1000 and 1101-1110, for example). Process 1200 details some embodiments of implementation of the disclosed asset management and visualization framework that automatically generates and causes display of a unified, interactive, asset centric analytics electronic interface (e.g., 500 and 1100).

Process 1200 begins with Step 1202 where a set of locations are identified. The locations can correspond to, for example, an industrial site(s) 402, as discussed above in relation to FIG. 4 (for purposes of Process 1200's discussion, location and site can be used interchangeably). In some embodiments, Step 1202 can involve the identification of the assets as such site(s) and the relationship among such assets (e.g., see, for example, assets 431a-431h of FIG. 4).

In Step 1204, each location's (or site's) operations are monitored and analytics data corresponding to each location's assets are retrieved, determined or otherwise identified. According to some embodiments, such monitoring and retrieval can occur according to a predetermined time period, continuously and/or in response to an input (e.g., a request from a user, another site, an administrator, in response to a detected error or critical data value surpassing a threshold, and the like, or some combination thereof).

In Step 1206, the retrieved data from the assets as the location(s) is analyzed. In some embodiments, such analysis can involve reformatting the data from each site to a universal format. In some embodiments, the reformatting can involve applying a universal tag (and removing a proprietary tag from the location) that is applied to all retrieved data prior to display. Such tag enables the uniform display of data across locations and/or assets, thereby enabling the data to be understood in relation to other types, forms and quantities of data from other locations, time periods, assets and the like.

In some embodiments, the analysis of Step 1206 can involve augmenting the data for display. Such augmentation can involve applying metadata to the retrieved data in order to enable the display of such data as a tile.

In some embodiments, the analysis of Step 1206 can be bypassed when the analysis is performed on site (e.g., prior to retrieval from the site or from the systems operating each asset).

In some embodiments, the analysis of Step 1206 can involve any type of known or to be known computational analysis technique, including but not limited to, vector analysis, data mining, computer vision, machine learning, neural network, artificial intelligence, and the like, or some combination. In some embodiments, such computerized analysis can enable the visualization of such data in a uniform manner across varying amounts of tiles, as discussed above and below.

Process 1200 continues with Step 1208, where based on the analysis in Step 1206, metrics for each location(s) and the assets at each location are determined. As discussed above, the metrics can be for individual assets and/or for a plurality of assets, as the metrics can include or can additionally provide information indicating the relationship between a assets and how they have operated over a time period (e.g., since the last data retrieval of Step 1204, or from a predetermined period (e.g., from the commencement of a task, job or application/operation), for example).

In Step 1210, a set of tiles (or interactive electronic cards) are compiled and generated based on the determined metrics of Step 1208. As discussed above, the tiles can include, but are not limited to, a pareto card, a MES card, an insight chart card, an alarms card, a generic card and/or an alerts card. In some embodiments, a status board can also be determined, compiled and generated in Step 1210.

In some embodiments, a type of tile (e.g., a pareto card, a IVIES card, an insight chart card, an alarms card, and/or an alerts card) can be determined based on the type of data received from the location(s)/asset(s).

In some embodiments, the tiles can be specific to a location, to a set of locations, to an asset at a location, to set of assets, to an asset working multiple locations, to a time period, to a particular job, task or application/operation, and the like, or some combination thereof.

In some embodiments, Step 1210 can also involve the compilation of the breadcrumb control, as discussed above.

In some embodiments, the compilation and generation of tiles of Step 1210 can involve the creation of data structures corresponding to each tile. Such data structures can be created and stored in a data base (e.g., database 403). Thus, new data can be created that is capable of being interacted with, manipulated and updated, thereby increasing the efficiency in which metrics about an operation can be retrieved and provided to a requesting entity or user.

Process 1200 can then proceed to Step 1212, where a determination is computationally performed to determine which tiles compiled in Step 1210 are to be displayed. In some embodiments, a subset of the compiled tiles are displayed; and in some embodiments, all of the tiles can be displayed.

In some embodiments, the determination in Step 12 can be based on which tiles are presenting critical information. For example, tiles that present data relating to an error or system issue that requires attention can be presented.

In some embodiments, the data on the tiles can be compared against a threshold, and upon satisfaction of the threshold, the corresponding tile can be eligible for presentation. In some embodiments, such comparison can occur in Steps 1208 and/or 1210, whereby a tag can be applied to the compiled tile and/or analyzed data that indicates a result of the threshold comparison. In some embodiments, the threshold can correspond to an indication of a critical error.

In some embodiments, the tiles determined to be displayed can be based on screen real-estate. That is, how much space is available on a device's screen, thereby the tiles with a particular data value, of a particular type or representing a particular location(s)/asset(s) can be selected therefrom.

In Step 1214, the user interface (UI) is generated and displayed. Non-limiting examples of the UI are illustrated in FIGS. 5 and 11, and non-limiting examples of tiles displayed therein are also illustrated in FIGS. 5 and 11, as well as FIGS. 6-10, as discussed above.

In some embodiments, Process 1200 proceeds to Step 1216 where input is received in relation to at least one of the tiles. As discussed above, the input can be for additional information about a particular data displayed within tile(s), a determination that another tile is to be displayed, a request to removal a tile from the UI, a refresh of tile data, a resizing of one or more tiles, and the like. Such input can be an automatic request according to a detection of a critical error our data value, a user request, request according to a time period, an administrator, a third party application or entity requesting information, and the like, or some combination thereof, as discussed above.

In Step 1218, in response to Step 1216, the UI is modified based on the input. For example, if one tile is requested to be resized larger, the other tile(s) displayed would be automatically resized smaller proportionate to the increase size of the tile receiving the input.

In some embodiments, the line recursively connecting Steps 1214, 1216 and 1218 to Step 1204 shows that the data can be updated, refreshed and automatically displayed within the tiles, as discussed above. This enables tiles to maintain their display within a UI while their data is being updated on the back-end. Thus, during a refresh, the data within the tile need only be updated (and not the entire container or data structure of a tile), and the interface data within the generated tile is then updated, thereby increasing the efficiency in which tile data is presented within a UI.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternative embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A computing device, comprising:
   one or more processors; and
   a non-transitory computer readable medium having stored therein a sequence of instructions, that when executed by the one or more processors, cause the one or more processors to perform actions comprising:
      receiving, over a network, asset information corresponding to a set of physical assets carrying out industrial operations at a location, the asset information comprising electronic data indicating information associated with each asset carrying out an industrial operation at the location;
      storing the asset information within a data store associated with the computing device;
      compiling, via execution of an application program interface (API), a set of tiles based on the stored asset information, each tile in said set of tiles corresponding to an asset within said set of physical assets, each tile being an interactive interface object that displays a respective asset's electronic data indicating information associated with an industrial operation being carried out by the respective asset at the location;
      generating, via the API, a user interface (UI), the UI comprising an electronic page with interactive functionality for displaying the set of tiles; and
      automatically causing display of said UI.

2. The computing device of claim 1, wherein the actions further comprise:
   analyzing the electronic data related to an asset's operation at the location; and
   determining, based on said analysis, a type of tile, wherein said compiled tile for the asset is based on said determined type.

3. The computing device of claim 1, wherein the actions further comprise:
   analyzing the electronic data related to an asset's operation at the location;
   determining, based on said analysis, whether a critical issue with the asset or the location is present; and
   identifying a subset of tiles based on said critical issue determination, wherein said UI is modified to display only the subset of tiles.

4. The computing device of claim 1, wherein the actions further comprise:
   receiving, via the UI, input related to a first tile within the displayed set of tiles of the UI;
   modifying, based on the input, attributes of the first tile based on the input; and
   modifying, based on the input, attributes of other tiles in the displayed set of tiles based on modification of the first tile.

5. The computing device of claim 4, wherein said attributes of the first tile and the other tiles corresponds to display characteristics of the tile.

6. The computing device of claim 4, wherein said input corresponds to a refresh request, wherein said attributes of the first tile corresponds to information displayed within the first tile related to operation of a respective asset at the location.

7. The computing device of claim 1, wherein said asset page further comprises an interface object associated with hierarchical mapping of each of the set of physical assets at the location, said interface object comprising a displayable node interface that enables additional elements associated with related assets within the hierarchical mapping to be displayed upon interaction with the node interface.

8. The computing device of claim 1, wherein the set of tiles comprises data associated with a type of electronic card selected from a group consisting of: a pareto card, a Manufacturing Execution System (MES) card, an insight chart card, an alarms card, a generic card and an alerts card.

9. The computing device of claim 8, wherein the pareto card comprises information indicating metrics for critical data for the set of physical assets operations at the location.

10. The computing device of claim 8, wherein the MES card comprises IVIES data for a particular asset.

11. The computing device of claim 8, wherein the insight chart card comprises iframe functionality for obtaining and displaying content relating to a particular asset and other content related to the particular asset.

12. The computing device of claim 8, wherein the alarms card comprises information indicating a number of active alarms over a predetermined period of time for a particular asset.

13. The computing device of claim 8, wherein the generic card comprises functionality for displaying tile data within a uniform look and feel, wherein the generic card is configured to function as a container for each type of tile.

14. The computing device of claim 8, wherein the alerts card comprises information active alerts for a particular asset.

15. The computing device of claim 1, wherein said asset information comprises data associated with a relationship between at least two assets within said set of physical assets, wherein at least one tile within said set of tiles corresponds to said data associated with said relationship.

16. A method comprising:

receiving, over a network, by a computing device, asset information corresponding to a set of physical assets carrying out industrial operations at a location, the asset information comprising electronic data indicating information associated with each asset carrying out an industrial operation at the location;

storing, via the computing device, the asset information within an associated data store;

compiling, via the computing device executing an application program interface (API), a set of tiles based on the stored asset information, each tile in said set of tiles corresponding to an asset within said set of physical assets, each tile being an interactive interface object that displays a respective asset's electronic data indicating information associated with an industrial operation being carried out by the respective asset at the location;

generating, via the API, a user interface (UI), the UI comprising an electronic page with interactive functionality for displaying the set of tiles; and automatically causing display of said UI.

17. The method of claim 16, further comprising:

analyzing the data related to an asset's operation at the location; and determining, based on said analysis, a type of tile, wherein said compiled tile for the asset is based on said determined type.

18. The method of claim 16, further comprising:

receiving, via the UI, input related to a first tile within the displayed set of tiles of the UI;

modifying, based on the input, attributes of the first tile based on the input; and modifying, based on the input, attributes of other tiles in the displayed set of tiles based on modification of the first tile.

19. A non-transitory computer-readable storage medium tangibly encoded with computer-executable instructions, that when executed by a processor associated with a computing device, performs a method comprising:

receiving, over a network by the computing device, asset information corresponding to a set of physical assets carrying out industrial operations at a location;

compiling, via the computing device, a set of tiles based on the received asset information, each tile in said set of tiles corresponding to an asset within said set of physical assets, each tile being an interactive interface object that displays data related to an asset carrying out an industrial operation at the location;

generating, via the computing device, a user interface (UI), said UI comprising an electronic page with interactive functionality for displaying said asset information as said set of tiles; and automatically causing display, via the computing device, of said UI on a display associated with the computing device, said caused display comprising the set of tiles.

20. The non-transitory computer-readable storage medium of claim 19, further comprising:

receiving, via the UI, input related to a first tile within the displayed set of tiles of the UI;

modifying, based on the input, attributes of the first tile based on the input; and modifying, based on the input, attributes of other tiles in the displayed set of tiles based on modification of the first tile.

\* \* \* \* \*